(12) United States Patent
Nishi et al.

(10) Patent No.: US 8,047,175 B2
(45) Date of Patent: Nov. 1, 2011

(54) IN-LINE FOUR CYLINDER ENGINE FOR VEHICLE AND VEHICLE PROVIDED WITH THE ENGINE

(75) Inventors: Kengo Nishi, Shizuoka (JP); Masao Furusawa, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 840 days.

(21) Appl. No.: 10/585,806

(22) PCT Filed: Jan. 12, 2005

(86) PCT No.: PCT/JP2005/000215
§ 371 (c)(1),
(2), (4) Date: Jul. 1, 2008

(87) PCT Pub. No.: WO2005/068872
PCT Pub. Date: Jul. 28, 2005

(65) Prior Publication Data
US 2008/0257296 A1 Oct. 23, 2008

(30) Foreign Application Priority Data
Jan. 14, 2004 (JP) .................... 2004-006431

(51) Int. Cl.
*F02B 75/06* (2006.01)
(52) U.S. Cl. ............... 123/192.2; 123/192.1; 123/572; 123/74 AE; 123/90.31; 123/197.4; 123/195 P; 123/41.7; 74/604; 74/572.1; 74/603

(58) Field of Classification Search ............... 123/192.2, 123/192.1, 572, 74 AE, 90.31, 197.4, 195 P, 123/41.7; 74/604, 572.1, 603
See application file for complete search history.

(56) References Cited

U.S. PATENT DOCUMENTS

| | | | | |
|---|---|---|---|---|
| 4,517,933 A | * | 5/1985 | Yasutake | 123/54.4 |
| 4,608,952 A | * | 9/1986 | Morita et al. | 123/198 F |
| 4,683,849 A | * | 8/1987 | Brown | 123/192.2 |
| 5,282,397 A | * | 2/1994 | Harkness et al. | 74/603 |
| 5,850,764 A | * | 12/1998 | Bostelmann et al. | 74/603 |
| 5,875,753 A | * | 3/1999 | Ishikawa | 123/192.2 |
| 6,260,532 B1 | * | 7/2001 | Mendler | 123/192.2 |
| 7,597,076 B2 | * | 10/2009 | Strauss et al. | 123/90.17 |

FOREIGN PATENT DOCUMENTS

| | | |
|---|---|---|
| JP | 56-046140 | 4/1981 |
| JP | 57-069137 | 4/1982 |
| JP | 60-263743 | 12/1985 |
| JP | 06-081899 | 3/1994 |
| JP | 09-250597 | 9/1997 |

OTHER PUBLICATIONS

JP 57-069137, Shimada Kuzuo.*
JP 09-250597, Kageyama Hidetoshi.*

* cited by examiner

*Primary Examiner* — Michael Cuff
*Assistant Examiner* — Long T Tran
(74) *Attorney, Agent, or Firm* — Rabin & Berdo, PC

(57) ABSTRACT

A two-plane type crankshaft is provided. The weight of crank webs for the respective cylinders is divided between left and right half webs and balance ratios $k_L$ and $k_R$ of the half webs for the respective cylinders are set so as to be $(k_L-0.25) \cdot (0.25-k_R) \cong D_R/D_L$ to form a track of a vector of a primary inertial couple into a substantial circle. A primary balancer offsets the primary inertia couple.

13 Claims, 12 Drawing Sheets

[Fig. 1]
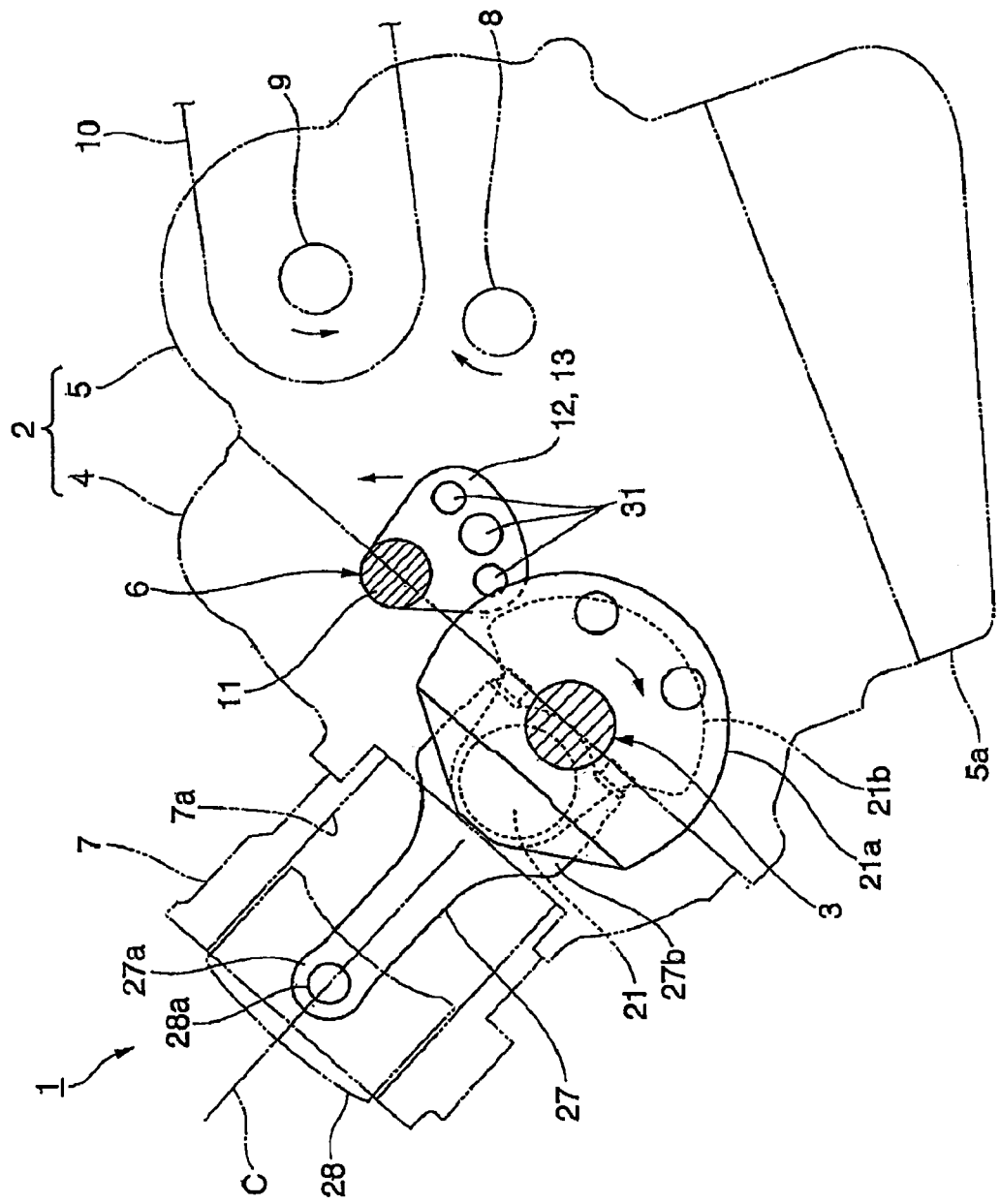

[Fig. 2]
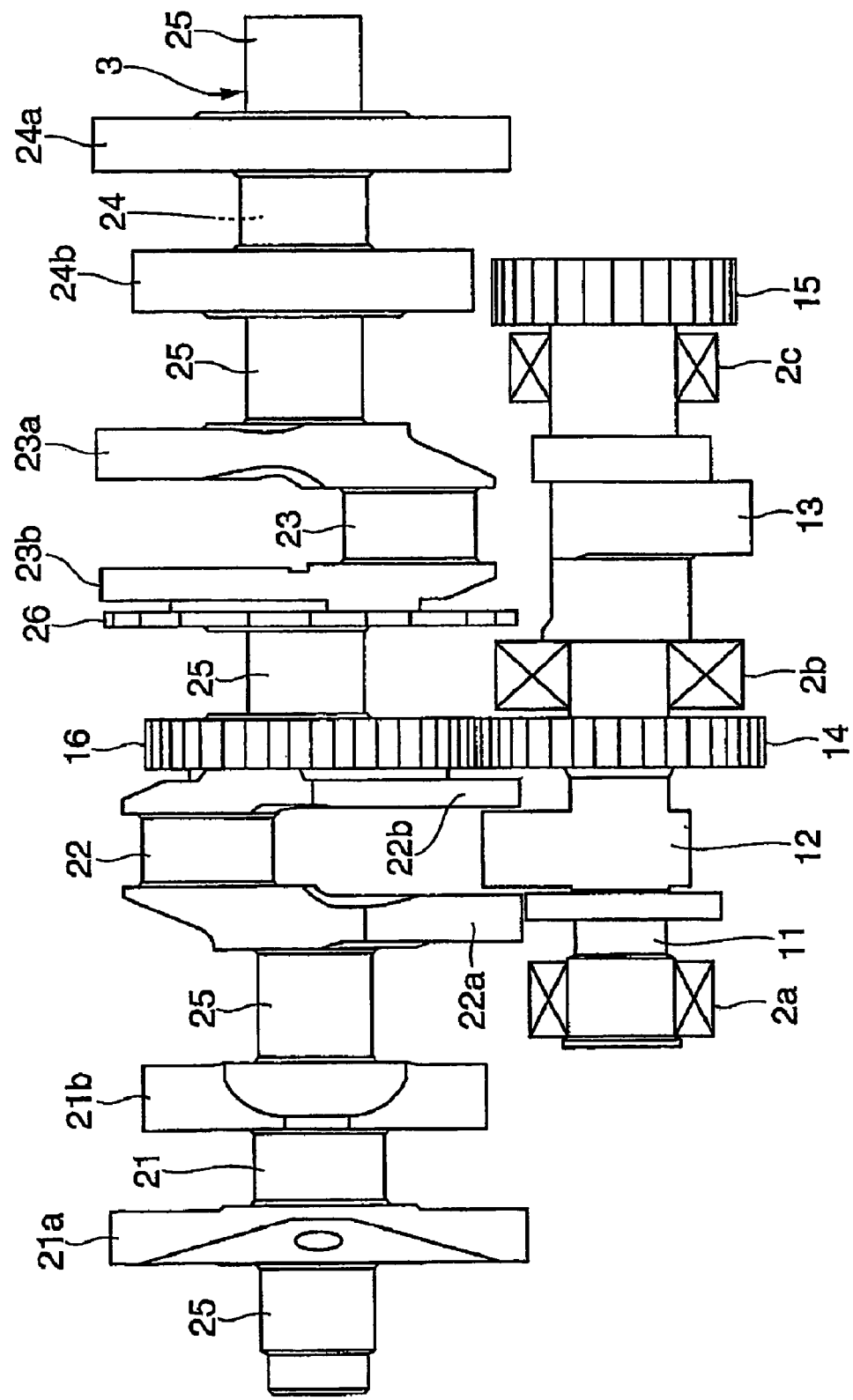

[Fig. 3]
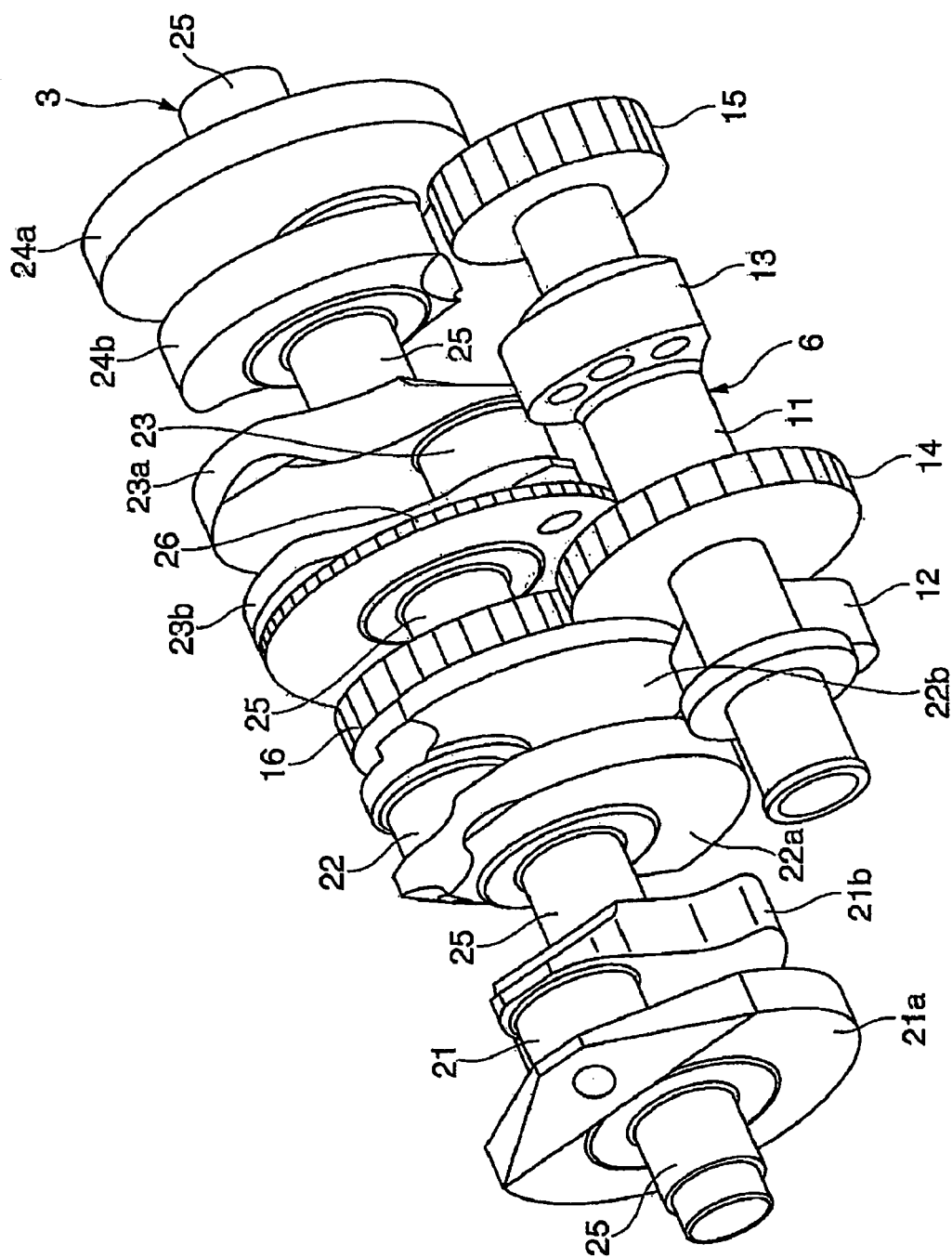

[Fig. 4]
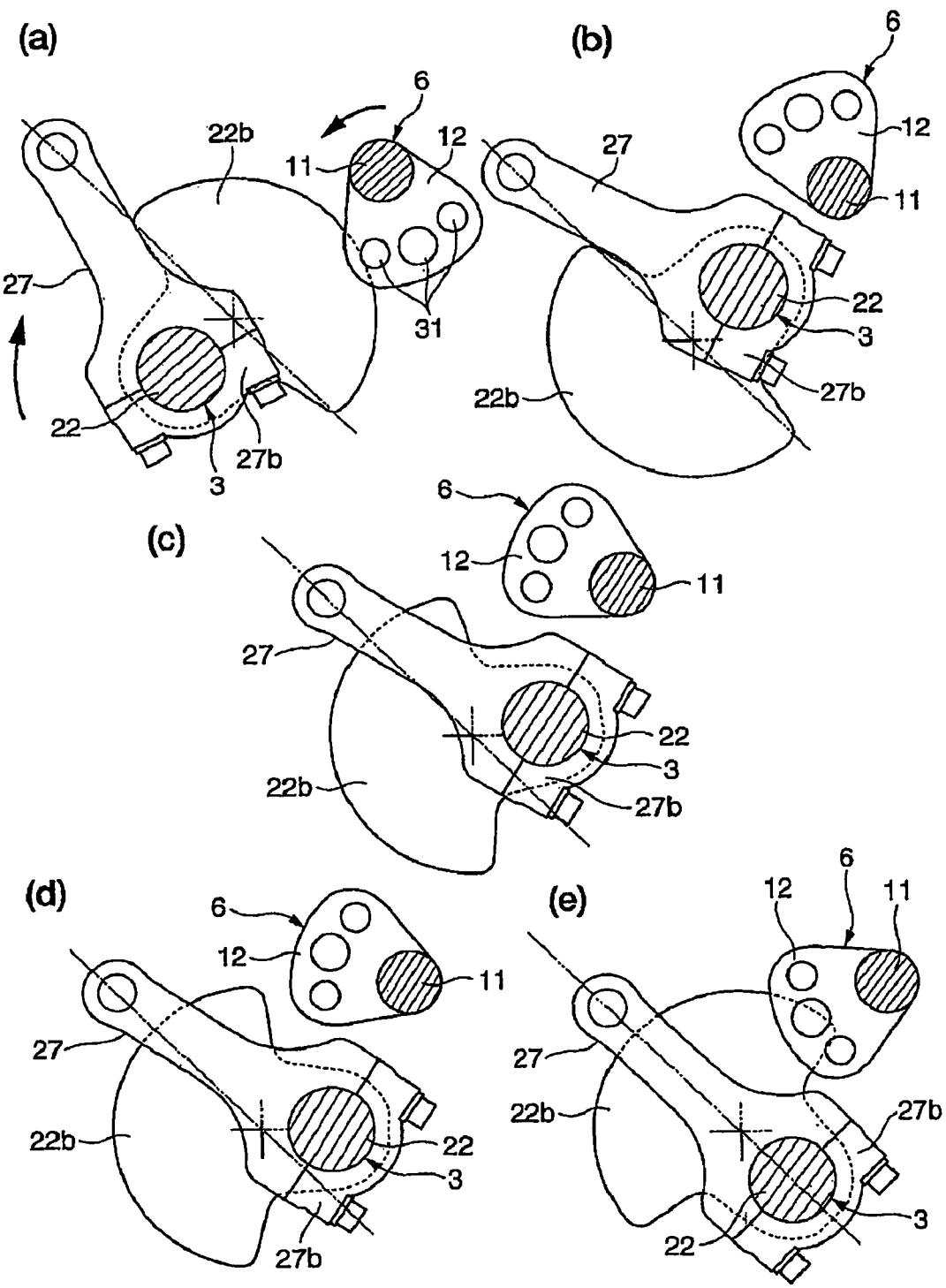

[Fig. 5]
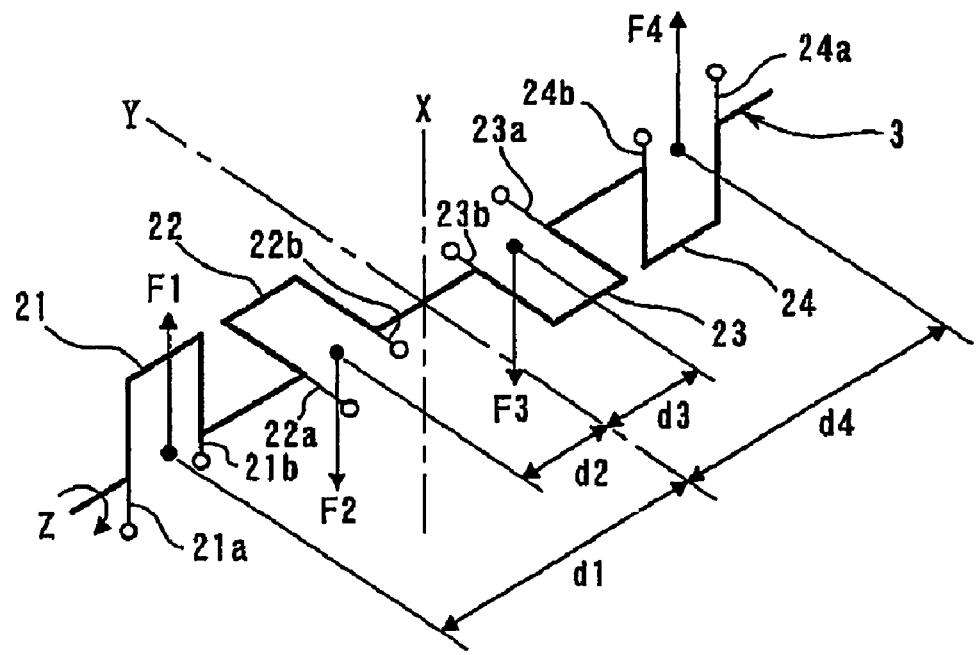
[Fig. 6]
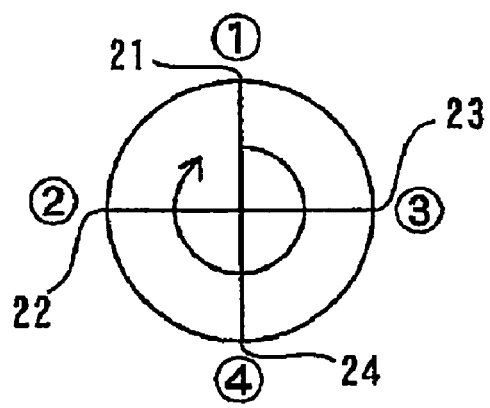

[Fig. 7]
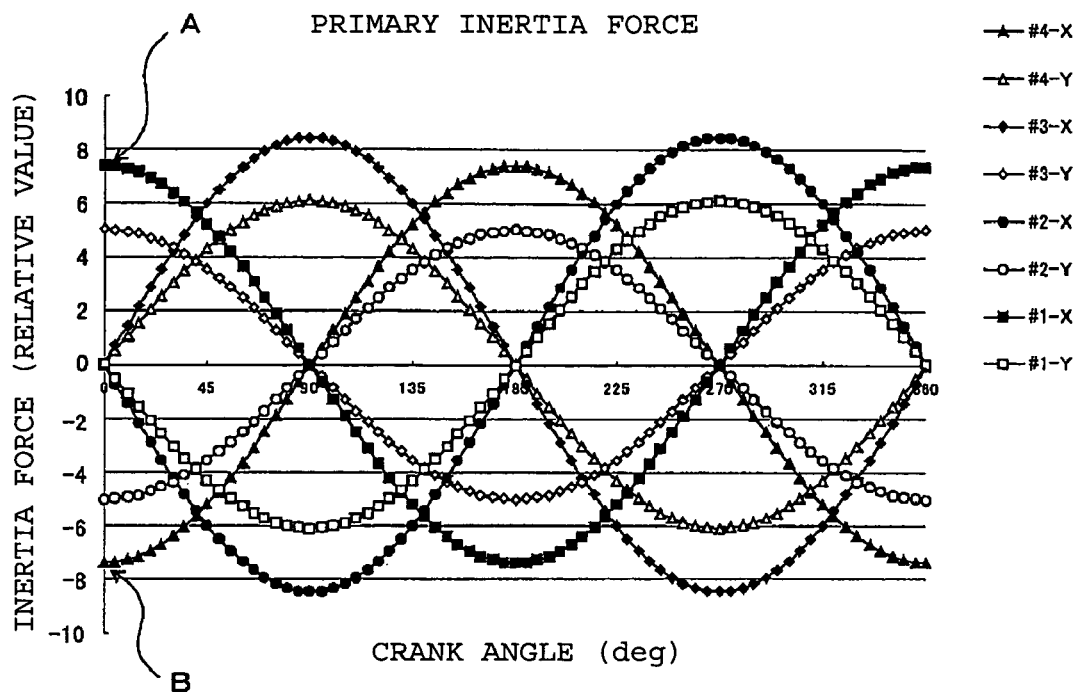
[Fig. 8]
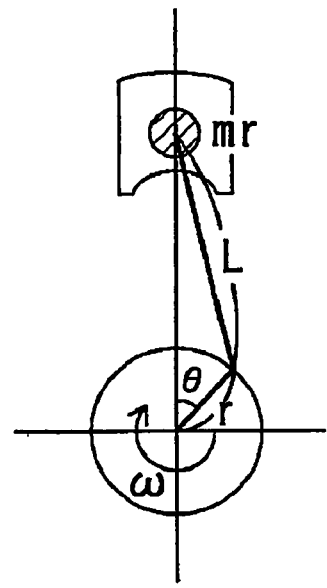

[Fig. 9]
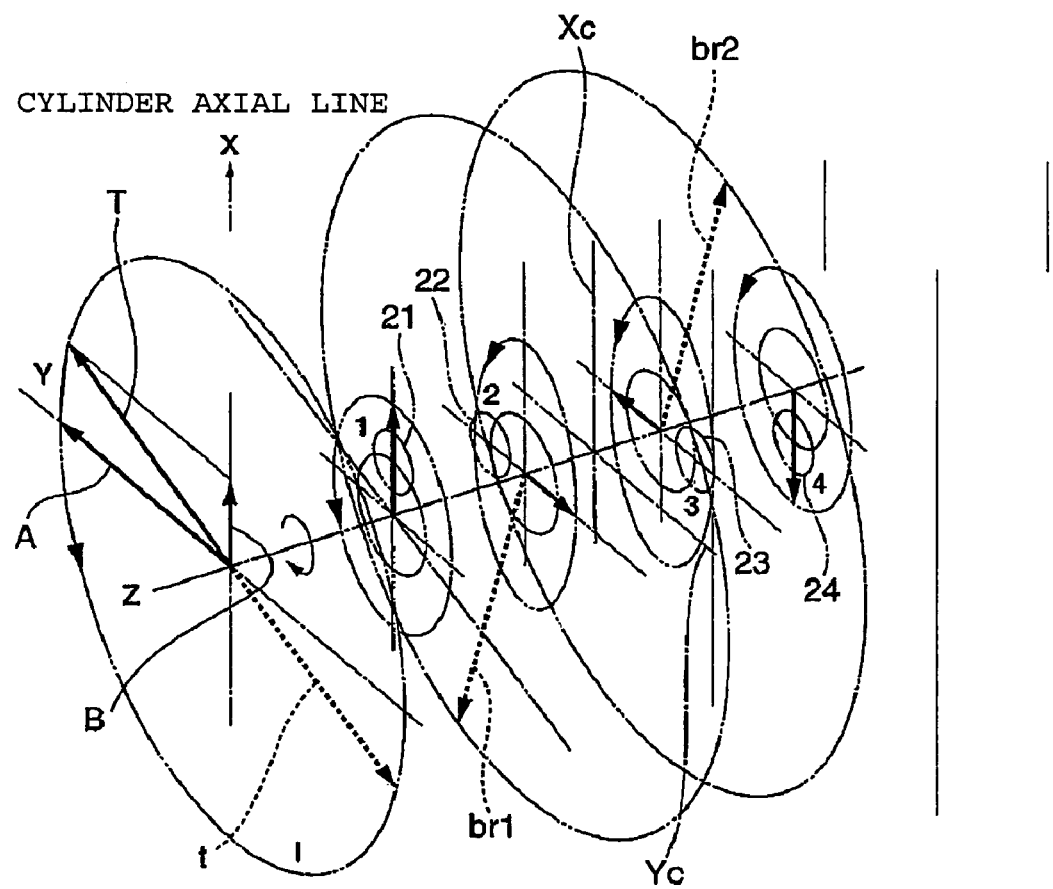

[Fig. 10]
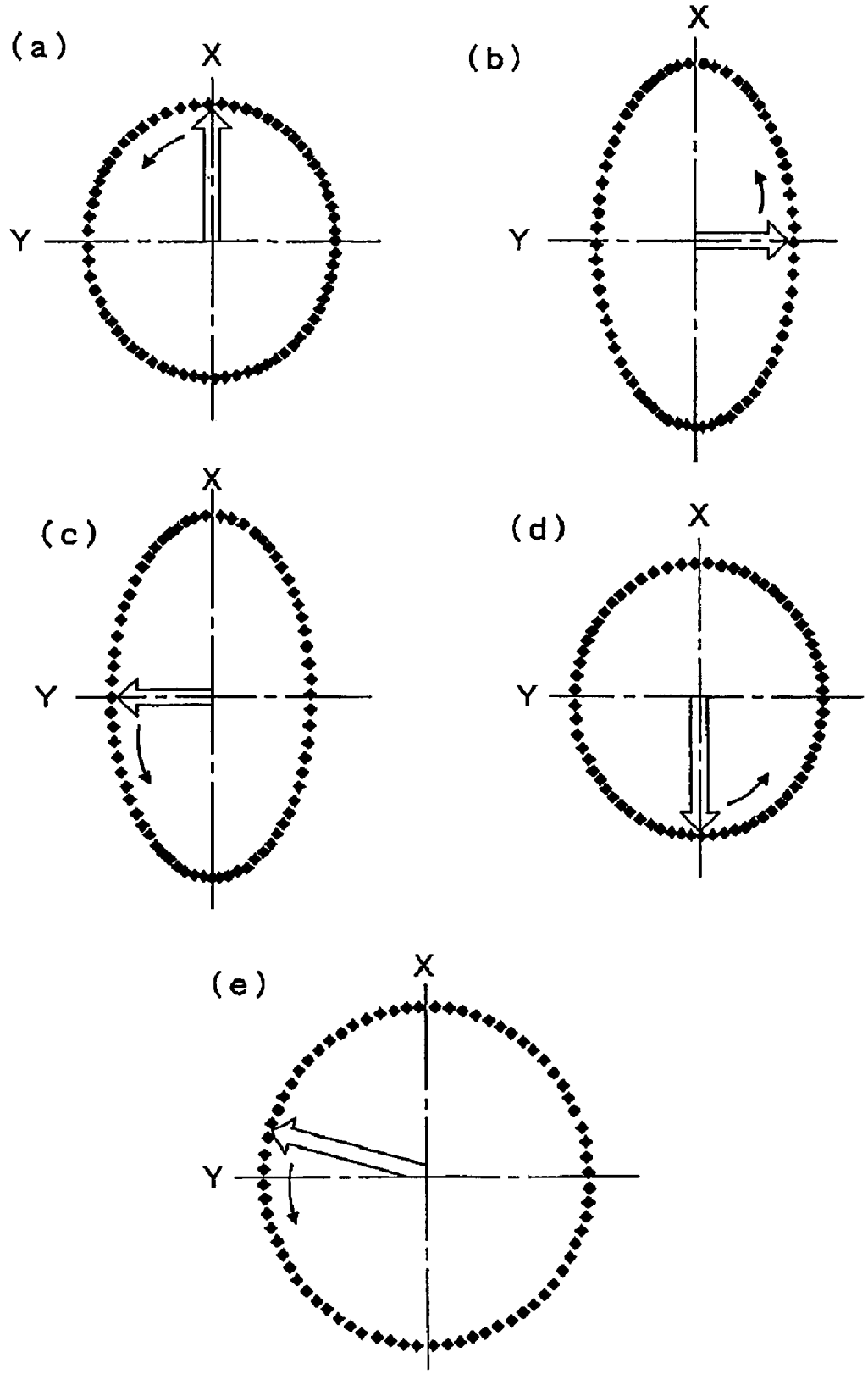

[Fig. 11]
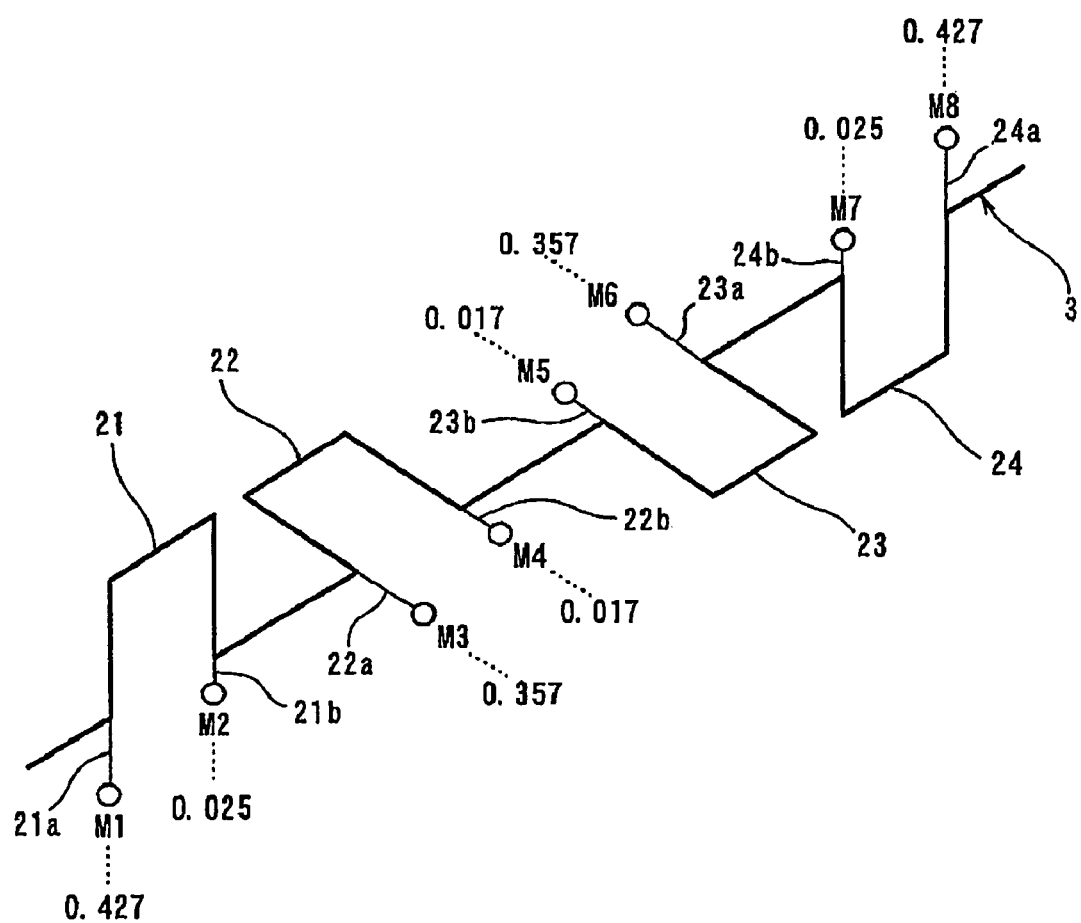

[Fig. 12]
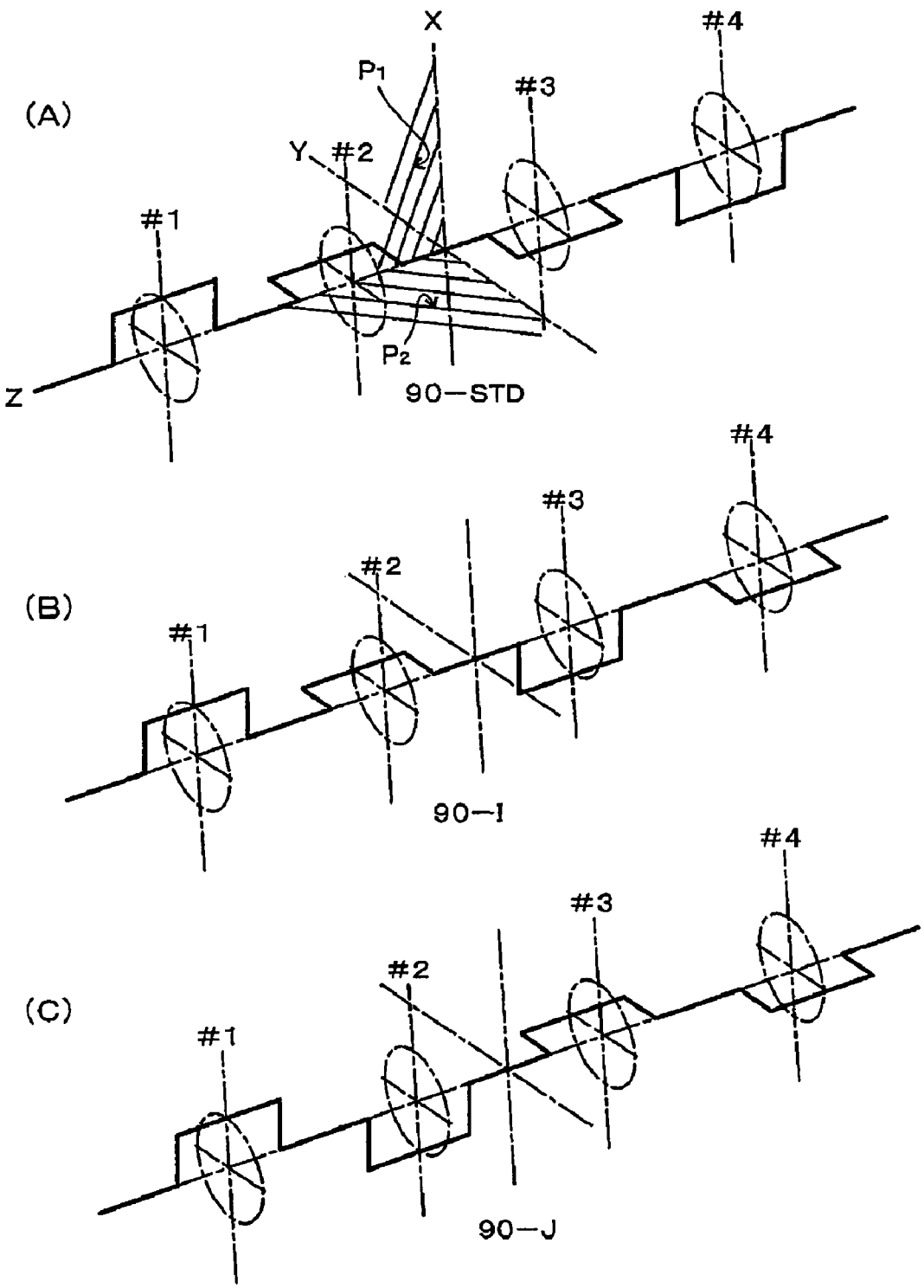

[Fig. 13]
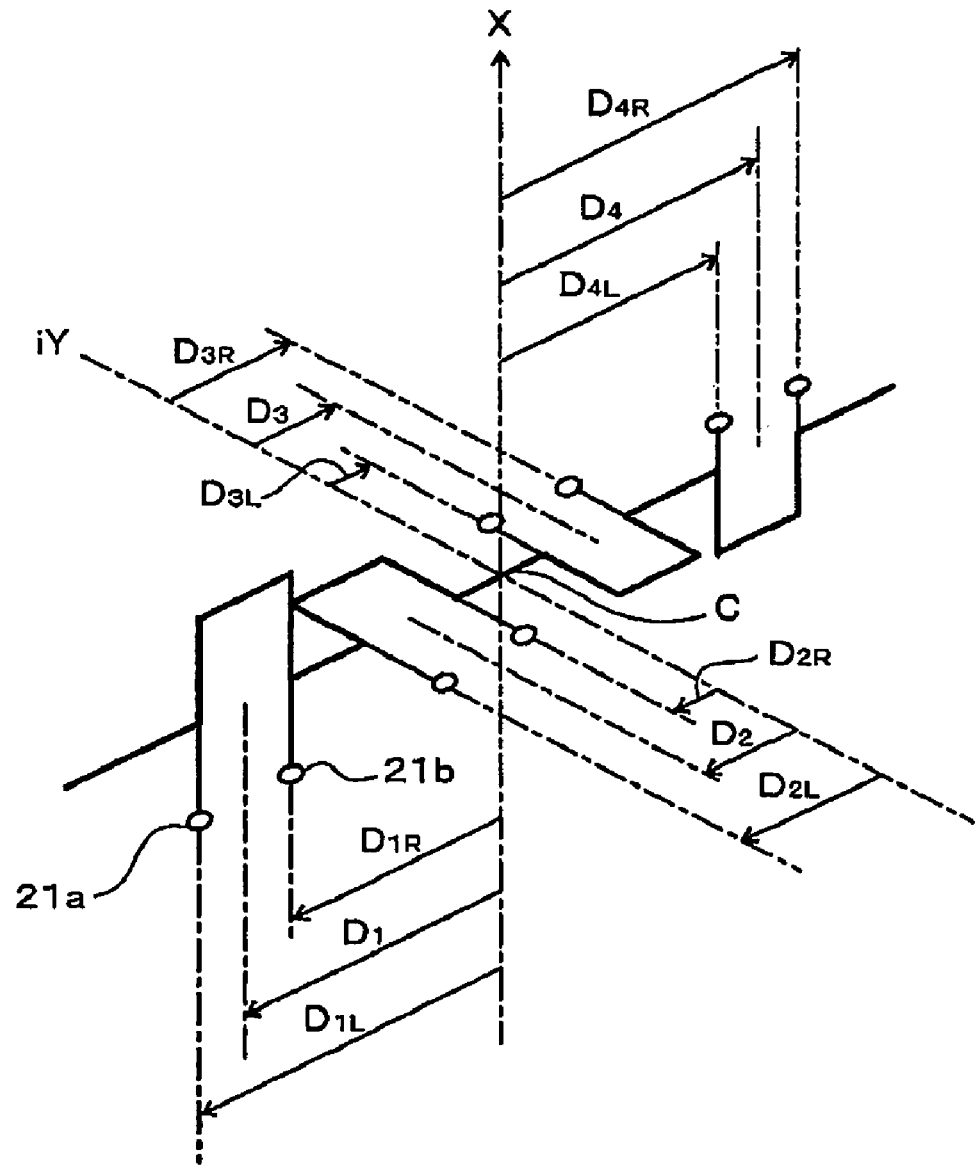

[Fig. 14]
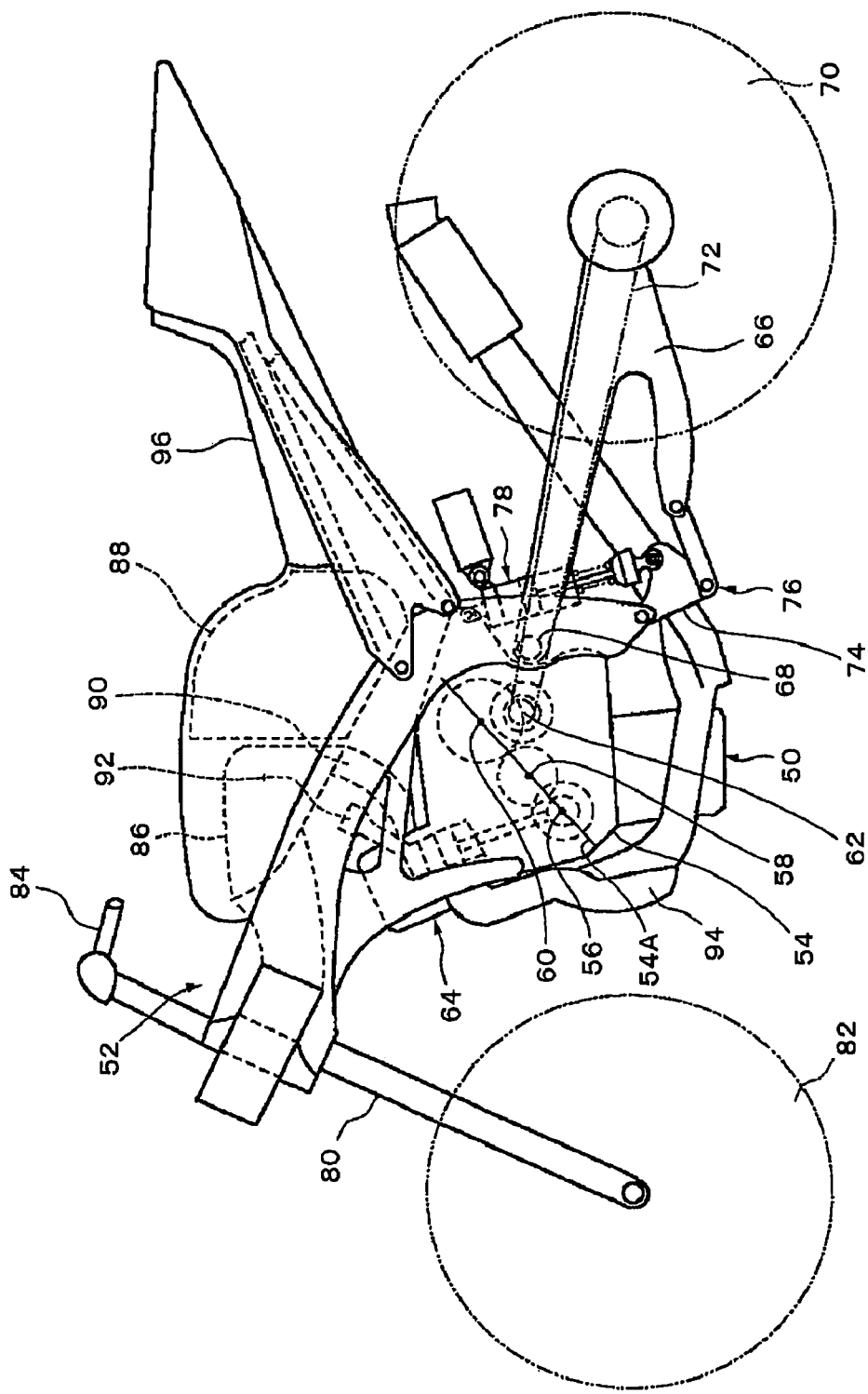

IN-LINE FOUR CYLINDER ENGINE FOR VEHICLE AND VEHICLE PROVIDED WITH THE ENGINE

CROSS-REFERENCE TO RELATED APPLICATIONS

This application is a national phase of PCT application No. PCT/JP2005/000215, filed Jan. 12, 2005, the entire contents of which are incorporated by reference. This application also claims benefit of priority under 35 USC 119 in Japanese Patent Application No. 2004-006431, filed Jan. 14, 2004, the entire contents of which are incorporated by reference.

TECHNICAL FIELD

This invention relates to an in-line four-cylinder engine for a vehicle provided with a primary balancer rotating at the same speed in the opposite direction as and to a crankshaft.

BACKGROUND ART

A so-called one-plane 180° type engine, that is, an engine with crankshaft arrangement in which crank pins of first and fourth cylinders are arranged in a same phase while crank pins of second and third cylinders are arranged with a 180° phase difference has been widely used as an engine for a vehicle conventionally.

JP-A-57-69137 and JP-A-9-250597 propose an engine for a vehicle in which a balancer (referred to as a primary balancer) for constant velocity is provided for a crankshaft whose arrangement of each crank pin is, respectively, 0° for a first cylinder, 90° for a second cylinder, 270° for a third cylinder and 180° for a fourth cylinder (referred to as a two-plane 90° type).

In a vehicle such as a motorbike provided with an engine using the above-mentioned two-plane 90° type crankshaft, a driver can feel driving torque from the engine more strongly than in the case of an engine using the former-mentioned one-plane 180° type crankshaft, from a point of view of S/N (SN ratio) of the driving torque, amplitude of vibrations, frequency and such. Thus, acceleration feeling, and thereby, a driving sense are improved. Therefore, it is strongly desired to put the two-plane 90° type engine for a vehicle into practice.

An engine in JP-A-57-69137 is provided on the premise that the total weight added to a crank web is set by adding ½ of the weight $W_{rec}$ of a reciprocating portion to the weight $W_{rot}$ of a rotating portion (refer to a formula (12) in the left column of Page 3). That is to say, $W_{rec}/2$ (additional weight, unbalance weight) is added other than the weight $W_{rot}$ balanced with the weight $W_{rot}$ of the rotating portion such as a large end portion of a connecting rod. Further, it can be seen that calculation is performed on the assumption that the weight of a crank web of each of the cylinders concentrates at the center of the cylinder, since the distance from the center of a crankshaft to the center of each of the first and fourth cylinders is set at $2a$, while the distance to the center of each of the second and third cylinders is set at $2b$ (refer to FIG. 1).

The crank web of each of the cylinders is actually divided between the left and the right with respect to the center of the cylinder. Accordingly, in order to assume that the sum of the halves of the crank web concentrates at the center of the cylinder, the additional weight of each of the half crank webs should be ¼ of the weight of the reciprocating portion. The engine in JP-A-57-69137 is provided on the premise that the additional weight of a whole crank web for each cylinder is ½ of the weight $W_{rec}$ of the reciprocating portion, namely, the additional weight of a half crank web is ¼ of the weight of the reciprocating portion.

In an actual engine design, however, it is often difficult to set the additional weight of a half crank web at ¼ of $W_{rec}$ since interference with other gears, bearings and the like in the vicinity of the crankshaft should be prevented. To achieve the same effect, enlargement of the rotational radius can also be considered. In this case, however, the crankshaft becomes large.

In the engine proposed in JP-A-9-250597, it is assumed, similar to the engine proposed in JP-A-57-69137, that the additional weight added to a crank web is ½ of the weight $W_{rec}$ of the reciprocating portion (in Paragraph 0022), and that the weight of a crank web for each cylinder concentrates at the center of the cylinder (in Paragraph 0018). Accordingly, the additional weight of each half crank web is assumed to be ¼ of the weight of the reciprocating portion as a premise. On the basis of this premise, in JP-A-9-250597, an isotropic balancer rotating at a constant velocity in an isotropic direction with respect to the crankshaft is provided, in addition to a reverse balancer rotating at a constant velocity in a reverse direction with respect to the crankshaft, and a part of the weight $W_{rec}/2$ added to the crankshaft is divided for the isotropic balancer so that the addition weight of the crankshaft is made ½ of $W_{rec}$ or less. In this case, however, a balancer rotating in the isotropic direction and a balancer rotating in the reverse direction cause unavoidable increase in size of the engine.

SUMMARY OF THE INVENTION

The present invention overcomes these problems, and a first object of the invention is to provide an in-line four-cylinder engine for a vehicle, which is compact and in which acceleration feeling is improved and a driving sense is extremely good.

Further, a second object of the invention is to provide a vehicle in which S/N of driving torque, amplitude of vibrations, frequency and such of an engine are improved to improve acceleration feeling and to make a driving sense extremely good.

In accordance with the invention, the first object is achieved by an in-line four-cylinder engine for a vehicle including a crankshaft having crank pins of two cylinders that are on a common first virtual plane and arranged with a 180° phase difference, and crank pins of the other two cylinders that are on a second virtual plane different by a 90° phase from the first virtual plane, and arranged with a 180° phase difference. The in-line four-cylinder engine comprises a crankshaft satisfying a formula of $(k_L-0.25)\cdot(0.25-k_R) \cong D_R/D_L$, wherein, when a crank web for each of at least two cylinders is divided between a pair of half crank webs faced with respect to a crank pin, $k_L$, $k_R$ denote balance ratios of the both half crank webs (wherein $k_L \neq 0.25$, $k_R \neq 0.25$) and $D_L$, $D_R$ denote distance from the center in a longitudinal direction of the crankshaft to the respective half crank webs. The crankshaft is arranged with crank webs for the four cylinders set so that a track of a vector of a primary inertial couple is formed into a substantially circular shape. A primary balancer generates a couple vector offsetting a vector of the first inertia couple.

The second object is achieved by a vehicle provided with the in-line four-cylinder engine described above.

The invention is made on the basis of a finding by the inventors that a state wherein the additional weight $W_{add}$ of half crank webs for at least two cylinders (actually, balance ratios $k_L$ and $k_R$ are used that are expressed by a ratio of one moment, which is the product of the weight and a rotational radius, and another moment, which is the product of the reciprocation weight and the rotational radius) and distances $D_L$ and $D_R$ from the center of the crank to the half crank webs satisfy a predetermined condition, is equivalent to a state wherein the additional weight $W_{add}$ of a crank web is ½ of the weight $W_{rec}$ of the reciprocating portion and the weight of the crank web concentrates at the center of the cylinder.

That is to say, satisfying the predetermined condition $(k_L-0.25)/(0.25-k_R) \cong D_R/D_L$ (wherein $k_L \neq 0.25$, $k_R \cong 0.25$) allows the acceleration feeling to be improved and a driving sense to be made extremely good as well as the additional weight $W_{add}$ of a half crank web to be varied.

Accordingly, the degree of design freedom of balance ratio, inertia mass and the like of a crank web can be increased since a half crank web for each cylinder can be changed in shape, so that the engine can be made compact. Moreover, a vehicle in which acceleration feeling is improved and a driving sense is extremely good can be provided.

BRIEF DESCRIPTION OF THE DRAWINGS

FIG. 1 is a side view of a schematic structure of an in-line four-cylinder engine for a vehicle in accordance with the invention.

FIG. 2 is a plan view of a crankshaft and a couple balancer.

FIG. 3 is a perspective view of a crankshaft and a couple balancer.

FIG. 4 is a sectional view for illustrating an operation of a crankshaft and a balancer.

FIG. 5 is a perspective view of a simplified structure of a crankshaft.

FIG. 6 illustrates crank angles.

FIG. 7 is a graph showing variations in primary inertia force for every cylinder.

FIG. 8 illustrates a simplified structure of a reciprocating portion.

FIG. 9 is a perspective view for illustrating a compound couple vector (T).

FIG. 10 illustrates compound vectors (a to d) of primary inertia force for every cylinder and a compound couple vector (e) of a whole engine.

FIG. 11 is a perspective view showing balance ratios of crank webs.

FIG. 12 illustrates forms of a crankshaft.

FIG. 13 shows balance ratios and distance D.

FIG. 14 is a side view of a motorbike provided with an engine.

DETAILED DESCRIPTION OF THE INVENTION

A balance ratio k for one crank web formed from a pair of half crank webs is defined by the following formula (1):

$$k=(M-W_{rot} \cdot r/2)/(W_{rec} \cdot r) \quad (1)$$

wherein M denotes total unbalance quantity of a crank web (whose unit is the moment g·mm), r denotes the rotational radius of $W_{rot}$ and $W_{rec}$. r is ½ of a rotational circle of a crank pin and also ½ of a stroke of the reciprocating portion. $W_{rot}$ denotes mass for a rotating portion and $W_{rec}$ denotes mass for a reciprocating portion (whose unit is g).

$(M/r-W_{rot}/2)=W_{add}$ is usually set at a half of the mass for a reciprocating portion $W_{rec}$. Accordingly, k=½ (50%) in the above case. In the invention, a crank web for a cylinder is divided between the left and the right to form half crank webs, and then, the balance ratios $k_L$ and $k_R$ of the crank webs are separately set. Thus, in the above case, $k_L$ and $k_R=(M-W_{rot} \cdot r/4)/(W_{rec} \cdot r)$ when M is assumed to be the unbalance quantity of a half crank web in the formula (1). The predetermined requirement is determined in view of the distances $D_L$ and $D_R$ of the respective crank webs from the center of the crankshaft under the above condition. The meaning of this requirement will be described later.

In the invention, it is clear that the crankshaft can be reduced in weight when $(k_L+k_R)$ is smaller than 0.5 (50%). This is especially suitable for an engine for a vehicle. In contrast, when $(k_L+k_R)$ is larger than 0.5 (50%), the half web on a side of the center of the crankshaft is increased in weight. In this case, however, the degree of freedom in design is increased in preventing interference with other members or in providing other gears or the like on the crankshaft. Further, the degree of freedom in determining the mass of a half web for each cylinder is increased and the weight concentrates on the center side of the crankshaft. This is suitable for keeping down torsional vibrations of the crankshaft, and a decrease in the weight of the crankshaft is achieved.

In the invention, two cylinders may satisfy the above-discussed requirements while the balance ratios $k_L$ and $k_R$ of the left and right half crank webs of the other two cylinders are respectively set at 0.25 and 0.25. Thus, the invention can be applied just to two arbitrary cylinders for reasons of engine layout, thereby increasing the degree of design freedom.

FIG. 12 depicts various arrangements of the crank pins of the crankshaft provided by the invention. In FIG. 12(A), an X-Z plane is defined as a first virtual plane P1 and an Y-Z plane is defined as a second virtual plane P2, wherein X, Y and Z axes cross at right angles. In FIG. 12(A), first to fourth cylinders are provided in this order from the left end. Crank pins of the first and fourth cylinders are located on the first virtual plane P1 while crank pins of the second and third cylinders are located on the second virtual plane P2. In this arrangement, which is referred to as an STD arrangement hereinafter, primary inertia force, secondary inertia force and a secondary inertia couple can be made 0 because of the symmetry of crank webs. In addition, a vector diagram of a primary inertia couple may be formed into an exact circle and completely removed by means of a primary balancer.

In the following description, terms such as "offset", "remove", "eliminate", "made to be 0" and the like are used in reference to the inertia force, the couple and such. These terms mean reduction to the extent that there is practically no problem and do not necessarily mean only reduction to 0. Preferably, just one primary balancer shaft is provided in order to make the engine compact. It is also within the scope of the invention, however, to divide the balancer shaft into two or more components.

In FIG. 12(B), crank pins of the first and third cylinders are provided on the first virtual plane while crank pins of the second and fourth cylinders are provided on the second virtual plane. This form is referred to as a 90-I arrangement hereinafter. In FIG. 12(C), crank pins of the first and second cylinders are provided on the first virtual plane while crank pins of the third and fourth cylinders are provided on the second virtual plane. This form is referred to as a 90-J arrangement hereinafter.

In the 90-I and 90-J arrangements, at least one of the primary inertia force and the secondary inertia couple remains a little, or the vector diagram of the primary inertia couple is formed into an ellipse close to a circle instead of an exact circle. Vibrations, however, are reduced to the extent that there is no problem in practical use.

In the STD arrangement, the first and fourth cylinders are preferably symmetrical (mirror arrangement) in balance ratios $k_L$ and $k_R$ and distances $D_L$ and $D_R$ with respect to the center of the crank, and the second and third cylinders are preferably symmetrical (mirror arrangement) with respect to the center of the crank. In this case, the primary balancer allows the primary and secondary inertia force and couples to be completely removed, as described above. A few vibrations, however, may be left by an asymmetrical configuration to reduce weight or to improve drive feeling.

In the 90-I and 90-J arrangements, the first and fourth cylinders and the second and third cylinders may be symmetrical in distances $D_L$ and $D_R$, respectively, while two arbitrarily combined cylinders may be symmetrical (mirror arrangement) in balance ratios $k_L$ and $k_R$. In this case, one or both of the primary inertia force and the secondary inertia couple remains a little, or the vector diagram of the primary inertia couple is formed into an ellipse. Some vibrations may be left to the extent that there is practically no problem in use in order to reduce weight or to improve drive feeling.

The balance weight of the primary balancer can be provided at a place opposite to the crank pins of the second and third cylinders (between the half crank webs) or a place opposite to the crank pins of the first and fourth cylinders (between the half crank webs). In this case, the balancer weight is close to the crankshaft, making the engine compact.

Embodiment 1

An embodiment of the in-line four-cylinder engine in accordance with the invention will be described in detail hereinafter on the basis of FIGS. 1 to 11. FIG. 1 is a side view of a schematic structure of an in-line four-cylinder engine in accordance with the invention. FIG. 2 is a plan view of a crankshaft and a couple balancer. FIG. 4 is a sectional view for illustrating an operation of a crankshaft and a balancer. FIG. 5 is a simplified perspective view of a crankshaft. FIG. 6 illustrates crank angles. FIG. 7 is a graph showing variations in primary inertia force. FIG. 8 illustrates a simplified structure of a reciprocating portion. FIG. 9 is a perspective view for illustrating a compound couple vector (T). FIG. 10 illustrates compound vectors (a to d) of primary inertia force for every cylinder and a compound couple vector T(e) of a whole engine. FIG. 11 is a perspective view showing balance ratios of crank webs.

In the above drawings, Numeral 1 denotes a water-cooled four-cycle in-line four-cylinder engine in Embodiment 1. The engine 1 is for a motorbike. In the engine 1, a crankshaft 3 is rotatably held in a crankcase 2 formed so as to be capable of division in a vertical direction. An axial line of the crankshaft 3 of the engine 1 is in parallel to a width direction of a vehicle. The engine 1 is mounted to a vehicle body frame (not shown) so that a left portion in FIG. 1 is located on a front side of a vehicle body.

The crankcase 2 is formed from an upper crankcase main body 4 and a lower crankcase main body 5 between which the crankshaft 3 and a couple balancer 6 are held so as to be able to rotate freely. A cylinder body 7 is mounted at an upper end portion of the upper crankcase main body 4. The lower crankcase main body 5 is provided with a main shaft 8 and a driving shaft 9 that can freely rotate. An oil pan 5a is mounted at a lower end portion of the lower crankcase main body 5. The cylinder body 7 is formed so that cylinder holes 7a for four cylinders are in line in the width direction of a vehicle and has a cylinder head (not shown) at the upper end thereof. The cylinder hole 7a is formed so that an axial line C slants rearward. In Embodiment 1, a first cylinder, a second cylinder, a third cylinder and a fourth cylinder are formed in this order from the left end of the vehicle body.

The main shaft 8 and the driving shaft 9 are connected to each other via a transmission (not shown) having a conventionally well-known structure. The main shaft 8 is provided at the right end portion of the vehicle with a clutch (not shown) mounted on the shaft. The main shaft 8 is connected by means of gears to the couple balancer 6 through the clutch and large reduction gear (not shown). The driving shaft 9 is provided at the left end portion of the vehicle with a sprocket (not shown) and is connected to a rear wheel (not shown) through a chain 10 provided around the sprocket for driving a rear wheel.

The couple balancer 6 removes the primary couple generated in accordance with rotation of the crankshaft 3. The couple balancer 6 comprises a balancer shaft 11 rotatably held in the crankcase 2 by means of bearings 2a to 2c and first and second balance weights 12 and 13 formed into one body with the balancer shaft 11, as shown in FIG. 2. The balancer shaft 11 is provided with a driven gear 14 between the both balance weights 12 and 13 and with a small reduction gear 15 at the right end portion of the vehicle.

The driven gear 14 is formed so that the number of rotations thereof is same as that of an output gear 16 of the crankshaft 3. The driven gear 14 is engaged with the output gear 16 while the small reduction gear 15 is engaged with the large reduction gear provided on the clutch side. That is, in the engine 1, rotation of the crankshaft 3 is transmitted to the main shaft 8 through the couple balancer 6 and the clutch, is further transmitted from the main shaft to the driving shaft through the transmission, and then, is transmitted from the driving shaft to a rear wheel via a chain for driving a rear wheel. Crankshaft 3 rotates in a clockwise direction in FIG. 1.

The crankshaft 3 comprises, for every cylinder, crank pins 21 to 24, first and second crank webs 21a, 21b, 22a, 22b, 23a, 23b, 24a and 24b and journal portion 25, as shown in FIGS. 1 to 3 and FIG. 5. The crankshaft 3 is provided at the center part in the axial direction of the crankshaft 3 with the output gear 16 and a crank angle sensor wheel 26. In FIGS. 1 and 4, 27 denotes a connecting rod, 28 denotes a piston and 28a denotes a pin piston.

Locations (crank angles) in a rotational direction of the respective crank pins 21 to 24 are set so that the crank angle of the crank pin 22 for the second cylinder is 270° with respect to the crank pin 21 for the first cylinder, the crank angle of the crank pin 23 for the third cylinder is 90° with respect to the crank pin 21 for the first cylinder and the crank angle of the crank pin 24 for the fourth cylinder is 180° with respect to the crank pin 21 for the first cylinder, as shown in FIG. 6. That is, the crankshaft 3 is of the two-plane type (the STD arrangement) in which the crank pin 21 for the first cylinder and the crank pin 24 for the fourth cylinder are located on the first virtual plane, while the crank pin 22 for the second cylinder and the crank pin 23 for the third cylinder are located on the second virtual plane, and in which the first and second virtual planes cross at right angles. Ignition of the engine 1 is carried out in the order of the first cylinder, the third cylinder, the second cylinder and the fourth cylinder.

The crank web is provided on its opposite side with respect to the core of the crankshaft 3 with a counter weight portion. The mass of the counter weight portion is set so as to reduce vibration force of the engine 1 in cooperation with the couple balancer 6. The mass is the sum of the weight $W_{rot}$ for balancing with the weight $W_{rot}$ of a rotating portion such as a large end portion of a connecting rod and the additional weight $W_{add}$ for balancing with a reciprocating portion. It has been found that setting the additional weight $W_{add}$ at about 50% of the mass of the reciprocating portion {the piston 28, the piston pin 28a and a small end part 27a of the connecting rod 27 (refer to FIG. 1)} of the engine 1 (the balance ratio is about 50%) allows the size of the couple operating in a rotation to be appropriate.

An appropriate size of couple in this context means a couple having a size that the couple balancer 6, which is mounted to the engine 1, can remove. In the two-plane type crankshaft 3 in Embodiment 1, the primary and secondary inertia force and the secondary couple are eliminated as described later. Accordingly, a track of movement of a couple compound vector of the remaining primary couple is a circle about the core of the crankshaft when the crank web is formed so that the balance ratio is about 50%. That is, generating a couple with couple balancer 6, which is a couple vector for offsetting the primary couple compound vector, allows the primary couple to be also eliminated. The reasons for elimination of the primary and secondary inertia force and the secondary couple, and a structure of the couple balancer 6 for eliminating the primary couple, are described below.

(1) Elimination of the Primary Inertia Force.

The primary inertia force operates upon the crankshaft 3 so as to correspond to reciprocation of the piston 28, as shown in FIG. 7. In FIG. 7, variations of the primary inertia force due to reciprocation mass of the respective cylinders are shown, the variations being divided between an X-axis component and a Y-axis component. As for the X-axis component, which is in the same direction as that of the piston 28, the inertia force due to the reciprocation mass of the first and fourth cylinders is offset by each other since the piston 28 of the first cylinder is at an upper dead point (Point A in FIG. 7) while the piston 28 of the fourth cylinder is at a lower dead point (Point B in FIG. 7). Similarly, the primary inertia force due to the reciprocation mass of the second and third cylinders is also offset by each other. Accordingly, the primary inertia force of the crankshaft 3 becomes 0 in theory.

(2) Elimination of the Secondary Inertia Force.

The second inertial force F1 to F4 due to the reciprocation mass of the respective cylinders is expressed by the following formulas (1) to (4) when the size and mass of the respective portions are defined as shown in FIG. 8. In FIG. 8, $m_r$ denotes mass of a reciprocating portion (g), L denotes the length of a connecting rod (mm), r denotes a piston stroke/2 (mm) and ω denotes 2πN/60 (rad). In the formulas (1) to (4), λ denotes the length of a connecting rod/r.

[Formula 1]

$$F1 = m_r r \omega^2 \times \left(\frac{1}{\lambda}\right) \times \cos 2\theta \quad (1)$$

$$F2 = m_r r \omega^2 \times \left(\frac{1}{\lambda}\right) \times \cos\{2(\theta + 3\pi/2)\} \quad (2)$$

$$F3 = m_r r \omega^2 \times \left(\frac{1}{\lambda}\right) \times \cos\{2(\theta + \pi/2)\} \quad (3)$$

$$F4 = m_r r \omega^2 \times \left(\frac{1}{\lambda}\right) \times \cos\{2(\theta + \pi)\} \quad (4)$$

The sum F(2) of F1 to F4 becomes 0 as shown in the following description. Accordingly, the secondary inertia force of the crankshaft 3 theoretically becomes 0.

[Formula 2]

$$F(2) = m_r r \omega^2 \times \frac{1}{\lambda}$$

$$\left\{\cos 2\theta + \cos 2\left(\theta + \frac{3}{2}\pi\right) + \cos 2\left(\theta + \frac{\pi}{2}\right) + \cos 2(\theta + \pi)\right\}$$

$$F(2) = m_r r \omega^2 \times \frac{1}{\lambda}$$

$$\{\cos 2\theta + \cos(2\theta + 3\pi) + \cos(2\theta + \pi) + \cos(2\theta + 2\pi)\}$$

wherein $\cos(\pi \pm \theta) = -\cos\theta$ $\cos(2n\pi + \theta) = \cos\theta$, and therefore, $$F(2) = m_r r \omega^2 \times \frac{1}{\lambda}\{\cos 2\theta - \cos 2\theta - \cos 2\theta + \cos 2\theta\}$$

$$F(2) = 0$$

(3) Elimination of the Secondary Couple.

The secondary couple is the sum of the moment around the Y axis, which is generated in accordance with an operation of the secondary inertia force F1 to F4 upon the crankshaft 3, as shown in FIG. 5. The Y axis is an axis crossing at right angles with the X axis, which is parallel to an axial line of a cylinder, and extending in a direction orthogonal to the Z axis, which is parallel to an axial line of the crankshaft 3. FIG. 5 shows a condition that the piston 28 of the first cylinder is located at the upper dead point.

The secondary inertia force F1 to F4 is repeatedly generated so that a cycle thereof is 180° in crank angle. Accordingly, a direction in which the secondary inertia force operates is the same between the first and fourth cylinders, whose crank angles are different by 180° from each other. The second cylinder, whose crank angle is different by 90° to the front side in a direction of the rotation with respect to the first cylinder, and the third cylinder, whose crank angle is different by 90° to the rear side in a direction of the rotation, are opposite to the first and fourth cylinders in a direction upon which the secondary inertia force operates. Therefore, the secondary couple FL formed by the sum of the moment is 0, as shown below, when d1 to d4 denote the distance from the Y axis to the respective cylinders, d1=d4 and d2=d3.

$$FL = F1 \times d1 - F2 \times d2 + F3 \times d3 - F4 \times d4 = 0$$

Thus, the secondary couple of the crankshaft 3 is 0.

(4) Structure of the Couple Balancer 6 for Eliminating Remaining Primary Couple.

The primary couple operating upon the crankshaft 3 is expressed by the sum of vectors of the primary inertia force operating upon the respective crank pins 21 to 24. This is described in detail with respect to FIG. 9. FIG. 9 shows a condition that the piston 28 of the first cylinder is located at the upper dead point, namely, a condition that the crank pin 21 for the first cylinder is located at an upper end of the drawing in the direction of the X axis (an axial line of the cylinder).

In this condition, a resultant force of the primary inertia force due to the mass of the reciprocating portion (the piston 28, the piston pin 28a and the small end part 27a of the connecting rod 27), and the primary inertia force due to the mass of the rotating portion (the crank pin 21, the large end part 27b of the connecting rod 27 and the crank webs 21a and 21b), are operated upward in the first cylinder. This is because the crankshaft 3 is formed so that the balance is about 50%, as described above, and the inertia force of the rotating portion, which operates downward, becomes about a half of the inertia force of the reciprocating portion, which operates upward. That is, in the first cylinder, a compound vector of the primary inertia force due to the reciprocation mass and the rotation mass is directed upward in parallel to the X axis. The size of the compound vector of the first cylinder varies as shown in FIG. 10(*a*). A direction of rotation of the compound vector is counterclockwise, inversely to the direction of rotation of the crankshaft.

In the second cylinder, the inertia force of the reciprocating portion is substantially 0 since the piston 28 is located at a substantially middle point between the lower dead point and the upper dead point. Accordingly, only the inertia force of the rotating portion (operating so as to be directed to the rear of the vehicle) operates in the second cylinder, so that the compound vector of the primary inertia force is directed rearward in parallel to the Y axis (rightward in FIG. 9). The size of the compound vector of the second cylinder varies as shown in FIG. 10(*b*). A direction of rotation of the compound vector is counterclockwise, inversely to the direction of rotation of the crankshaft.

In the third cylinder, the inertia force of the reciprocating portion is substantially 0 since the piston 28 is located at a substantially middle point between the upper dead point and the lower dead point, so that only the inertia force of the rotating portion operates. Accordingly, the compound vector of the primary inertia force of the third cylinder is directed forward in parallel to the Y axis (leftward in FIG. 9). The size of the compound vector of the third cylinder varies as shown in FIG. 10(*c*). A direction of rotation of the compound vector is counterclockwise, inversely to the direction of rotation of the crankshaft.

In the fourth cylinder, the inertia force of the reciprocating portion is directed downward since the piston 28 is located at the lower dead point, so that the inertia force of the rotating portion, which is about a half of that of the reciprocating portion, is directed upward. Accordingly, the compound vector of the primary inertia force of the fourth cylinder is directed downward in parallel to the X axis. The size of the compound vector of the fourth cylinder varies as shown in FIG. 10(*d*). A direction of rotation of the compound vector is counterclockwise, inversely to the direction of rotation of the crankshaft.

The compound vector of the first cylinder and the compound vector of the fourth cylinder are substantially same in size and opposite by 180° in direction. Accordingly, the primary inertia force operating upon the crank pins 21 and 24 of the both cylinders forms a couple. The couple is referred to as a first couple hereinafter. The first couple is a couple passing through the center line in the axial direction of the crankshaft 3, the couple being for rotating the crankshaft 3 about a virtual axial line YC parallel to the Y axis, in FIG. 9. A vector of the first couple is in a direction that a right screw goes when the couple is in the same direction as the rotational direction in fastening the screw. That is, the vector of the first couple is directed forward along the virtual axial line YC. In FIG. 9, a plane in which the virtual axial line YC is located and which is orthogonal to the axial line of the crankshaft 3 is shown as a virtual plane I at the left end of the drawing for the purpose of easy understanding. In the virtual plane I, A denotes the vector of the first couple.

On the other hand, the compound vector of the second cylinder and the compound vector of the third cylinder are substantially same in size and opposite by 180° in direction. Accordingly, the primary inertia force operating upon the crank pins of the both cylinders causes a second couple. A vector of the second couple is in a direction that a right screw goes when the couple is in the same direction as the rotational direction in fastening the screw. Therefore, the vector of the second couple passes through the center line in the axial direction of the crankshaft 3 and is directed upward along a virtual axial line XC parallel to the X axis, in FIG. 9. In the virtual plane I, B denotes the vector of the second couple.

Compounding the vectors A and B allows direction and size of the total couple operating upon the engine 1 to be obtained. A compound couple vector T of the vectors A and B is directed to an obliquely upper front side. The size of the compound couple vector T varies as shown in FIG. 10(*e*). A direction of rotation of the compound couple vector T is also counterclockwise, inversely to the direction of rotation of the crankshaft.

The compound couple vector T indicates a whole primary couple of the engine 1. Accordingly, generating a couple of a vector, which has point symmetry with the compound couple vector T, (shown by a broken line t in FIG. 9) by means of the couple balancer 6 allows the whole primary couple generated in the engine 1 to be eliminated. A vector t having point symmetry with the compound couple vector T is referred to as a balancer vector hereinafter. In order to balance the couple compound vector T and the balancer vector t, it is most effective to make a track of rotation of the compound couple vector T shown in FIG. 10(*e*) exactly circular.

In Embodiment 1, the balance in weight of the crank webs is about 50% so that the track of rotation is a substantially exact circle. In the couple balancer 6 having the balance vector t, inertia force is generated in a direction shown by broken lines br1 and br2 in FIG. 9. That is, forming the couple balancer 6 so that the inertia force is br1 and br2 allows the primary couple of the engine 1 to be balanced by means of the couple balancer 6, and thereby, to be eliminated.

Now, a method of determining the balance in weight of the crank webs so that the track of rotation is a circle is described. When Mr denotes reciprocation mass of the respective cylinders (unit is a moment g·mm), Mo denotes rotation mass of the respective cylinders (unit is a moment g·mm) and M1 to M8 denote unbalance quantities of two half crank webs for the respective cylinders in order from the first cylinder (a moment g·mm), the balance ratios k of the respective half crank webs are expressed by the following formula:

$$k(1 \text{ to } 8) = \{M(1 \text{ to } 8) - M_0/4\}/Mr$$
$$= \{M(1 \text{ to } 8) - W_{rot} \cdot r/4\}/W_{rec} \cdot r$$

The unbalance quantities M1 to M8 are obtained by a formula of: M1 to M8=0.25×Mr+M$_0$/4, for example, for the purpose of making the compound vector of the primary inertia force in all of the cylinders constant (circular). In the case that M1 is same as M4 and M2 is same as M3, the balance ratio k of one of a pair of half crank webs can be set at less than 0.25 while the balance ratio k of the other can be set to be large by the quantity corresponding to that of the above.

The half crank web away from the center of the crankshaft influences the couple much more than the half crank web close to the center of the crankshaft since a couple is proportional to the distance D (D$_L$ and D$_R$) from the center of a crankshaft. Accordingly, making the balance ratio (k$_L$) of the half crank web away from the center of the crankshaft large allows the balance ratio (k$_L$) of the half crank web close to the center of the crankshaft to be made small, so that the sum of them (k$_L$+k$_R$) can be made smaller than 50%.

In Embodiment 1, the balance ratios k (1 to 8) of the respective half crank webs are set as shown in FIG. 11. That is, for the first and fourth cylinders, the balance ratios of the crank webs 21*a* and 24*a* located outside the engine are set at 0.427 while the balance ratios of the crank webs 21*b* and 24*b* located inside the engine 1 are set at 0.025 so that the total balance ratio of both crank webs is 0.452. For the second and third cylinders, the balance ratios of the crank webs 22a and 23a located outside the engine 1 are set at 0.357 while the balance ratios of the crank webs 22b and 23b located inside the engine 1 are set at 0.017 so that the total balance ratio of both crank webs is 0.374.

It is possible to set all of the balance ratios $k_{1L}$, $k_{1R}$, $k_{4R}$ and $k_{4L}$ of the crank webs 21a, 21b, 24a and 24b for the first and fourth cylinders at 0.25 and the balance ratios $k_{2L}$, $k_{2R}$, $k_{3R}$ and $k_{3L}$ for the second and third cylinders at a value other than 0.25 ($k_{2L}=k_{3R}=0.357$ and $k_{2R}=k_{3L}=0.017$, for example). Contrary to the above, all of the balance ratios $k_{2L}$, $k_{2R}$, $k_{3R}$ and $k_{3L}$ for the second and third cylinders are set at 0.25 while the balance ratios $k_{1L}$, $k_{1R}$, $k_{4R}$ and $k_{4L}$ for the first and fourth cylinders are set at a value other than 0.25 ($k_{1L}=k_{4R}=0.427$ and $k_{1R}=k_{4L}=0.025$, for example).

The couple balancer 6 is provided at a location away from the crankshaft 3 rearward (rearward along the Y axis shown in FIG. 9), as shown in FIGS. 1 to 4, while the first and second balance weights 12 and 13 are located so as to correspond to the crank pins 22 and 23 of the second and third cylinders. The first and second balance weights 12 and 13 in Embodiment 1 are formed in the shape of a fan from a view in the direction of the axial line. The first and second balance weights 12 and 13 are formed to face a space between the crank webs 22a and 22b for the second cylinder and a space between the crank webs 23a and 23b for the third cylinder when they move to a location closest to the crankshaft. Heavy metal 31 is built into the first and second balance weights 12 and 13 for the purpose of adjusting the mass. The first balance weight 12 generates the inertia force shown by br1 in FIG. 9. The second balance weight 13 generates the inertia force shown by br2 in FIG. 9.

The couple balancer 6 in Embodiment 1 is located at a place close enough to the crankshaft 3 so that the first and second balance weights 12 and 13 do not contact the large end portion 27b of the connecting rod 27, as shown in FIGS. 4(a) to 4(e). FIG. 4(a) shows locations of the crank pin 22 of the second cylinder and the first balance weight 12 when the piston 28 of the first cylinder is located at the upper dead point. FIG. 4(b) shows a state in which the crankshaft 3 is rotated by 180° from the location in the state shown in FIG. 4(a). FIG. 4(c) shows a state in which the crankshaft 3 is rotated by 217.5° from the location in the state shown in FIG. 4(a). FIG. 4(d) shows a state in which the crankshaft 3 is rotated by 225° from the location in the state shown in FIG. 4(a). FIG. 4(e) shows a state in which the crankshaft 3 is rotated by 270° from the location in the state shown in FIG. 4(a). The locations of the large end portion 27b of the connecting rod 27 and the second balance weight 13 for the third cylinder are similar to the locations in FIG. 4, but the phase is different by 180°. Providing the balance weights for the first and fourth cylinders enables the shape to be advantageous in avoiding contact with the large end portion 27b of the connecting rod. That is, it is possible to make the shape of a fan large.

In the in-line four-cylinder engine 1 having the above-mentioned structure, the primary inertia force, the secondary inertia force and the secondary couple are eliminated only by means of the crankshaft 3 while the remaining primary couple are eliminated by means of the couple balancer 6. The couple balancer 6 does not need to be provided on a side opposite to the cylinder with respect to the crankshaft 3 and can be provided by the side of the crankshaft 3 (a rear side or a front side of a vehicle body), as exemplified in Embodiment 1.

Accordingly, providing the couple balancer 6 by the side of the crankshaft 3 allows a compact in-line four-cylinder engine in an axial direction of the cylinder to be provided. In such an engine 1, the couple balancer 6 does not agitate oil in the oil pan 5a, so that loss in power is little and the capacity of the oil pan 5a can be made large.

Further, the engine 1 in Embodiment 1 is arranged so that a part of the first balance weight 12 of the couple balancer 6 faces a space between a pair of half crank webs 22a and 22b for the second cylinder of the crankshaft 3, while the second balance weight 13 of the couple balancer 6 faces a space between a pair of half crank webs 23a and 23b for the third cylinder. Accordingly, the couple balancer 6 is compact in the axial direction and is provided closely enough to the crankshaft 3.

Therefore, the in-line four-cylinder engine is more compact.

Moreover, the balance weights may face a space between the pair of half crank webs for the first cylinder and a space between the pair of half crank webs for the fourth cylinder. In this case, the weight is decreased more than in the former case, so that a load of a bearing is reduced. In addition, the shape can be advantageous in avoiding contact of the balance weights with the large end part 27b of a connecting rod as described above. This increases the degree of freedom in designing the shape of the balance weight, so that a more compact engine can be achieved.

Now, described will be a reason why setting the balance ratios k (1 to 8) of the respective half crank webs as shown in FIG. 11 allows a track of a vector of the primary inertia couple to be formed into a circle as a premise of the invention, made reference to FIG. 13.

$D_1$ to $D_4$ denote distance from the center C of the crankshaft to the center of the respective cylinders while $D_{1L}$, $D_{1R}$, $D_{2L}$, $D_{2R}$, $D_{3L}$, $D_{3R}$, $D_{4L}$ and $D_{4R}$ denote distance to the half crank webs of the respective cylinders. Further, $k_{1L}$, $k_{1R}$, $k_{2L}$, $k_{2R}$, $k_{3L}$, $k_{3R}$, $k_{4L}$ and $k_{4R}$ denote the balance ratios k (1 to 8) of the respective half crank webs in order from the first cylinder.

The crankshaft is assumed to be symmetrical with respect to the center thereof for the purpose of simplifying calculations. In this case, the following formulas are satisfied:

$$D_1=D_4$$

$$D_2=D_3$$

$$D_{1L}=D_{4R}$$

$$D_{1R}=D_{4L}$$

$$D_{2L}=D_{3R}$$

$$D_{2R}=D_{3L}$$

$$k_{1L}=k_{4R}$$

$$k_{1R}=k_{4L}$$

$$k_{2L}=k_{3R}$$

$$k_{2R}=k_{3L}$$

The primary inertia couple M(1) is calculated on the basis of the above premise. That is to say, a couple generated at the center C of the crankshaft by the primary inertia force F(1) of each cylinder is obtained for every cylinder and the sum of them is denoted by M(1).

The sum M(1) is obtained as described below.

First, the first cylinder is taken into consideration. The X and Y axes are provided as shown in FIGS. 5 and 13 wherein the Y axis is an imaginary number axis. The following formulas are obtained:

$$M_{1L}=iD_{1L}\{k_{1L} \cdot F \cdot e^{i(\theta+\pi)}\}$$

$$M_{11}=iD_1 \cdot F \cdot \cos\theta$$

$$M_{1R}=iD_{1R}\{k_{1R} \cdot F \cdot e^{i(\theta+\pi)}\}$$

wherein $M_{1L}$ and $M_{1R}$ denote the moment operating on the left and right half webs 21a and 21b and $M_{11}$ denotes the moment (in an opposite direction to that of $M_{1L}$ and $M_{1R}$) operating on the center of a cylinder.

This is true of the second to fourth cylinders, except for $\theta$. Accordingly, adding the above to the four cylinders to arrange the formulas allows M(1) to be obtained.

The following relations (2) and (3) are used for calculation to obtain M(1) by means of the following formula (4):

$$D_{1L}k_{1L} + D_{1R} \cdot k_{1R} = D_1 k_1 \equiv A \qquad (2)$$

$$D_{2L}k_{2L} + D_{2R}k_{2R} = D_2 k_2 \equiv B \qquad (3)$$

$$M(1) = \qquad (4)$$
$$(D_1 k_1 \sin\theta + D_2 k_2 \cos\theta) \cdot 2 \cdot F + \{D_1(1-k_1)\cos\theta + D_2(k_2-1)\sin\theta\}2Fi$$

In the case of $k_1=k_2=0.5$ (the balance ratio is 50%), $$M(1)=(D_1 \sin\theta + D_2 \cos\theta)F + (D_1 \cos\theta + D_2 \sin\theta)Fi \qquad (5)$$

The formula (5) expresses a circle of the radius $F \cdot \{(D_1^2 + D_2^2)\}^{1/2}$. Accordingly, it can be seen that the primary balancer can be used for an offset in the case of $k_1=k_2=0.5$. Now, the first cylinder is taken into consideration. When a standard value of the balance ratios $k_{1L}$ and $k_{1R}$ is assumed to be 0.25, the deviation from the standard value is $(k_{1L}-0.25)$. It is known that $k_1=0.5$ when the following formula (6) is satisfied in the above condition.

$$(k_{1L}-0.25)/(0.25-k_{1R}) = D_{1R}/D_{2R} \qquad (6)$$

$$k_{1L} = (k_{1R}/k_{1L})(0.25-k_{1R}) + 0.25$$

$$A = 0.25(D_{1R}+D_{1R})$$
$$= 0.25 \cdot 2D_1$$
$$= 0.5 D_1$$

wherein it is meant that A is defined by the formula (2) and $k_1=0.5$ in the formula.

The second cylinder is arranged so that $k_2=0.5$ when the following formula is satisfied:

$$(k_{2L}-0.25)/(0.25-k_{2R})=D_{1R}/D_{2R} \qquad (7)$$

Accordingly, the vector M(1) is formed into a circle when the formulas (6) and (7) are satisfied. The balance ratios $k_{1L}, \ldots, k_{4L}$ and $k_{4R}$ in FIG. 11 are determined on the basis of the formulas (6) and (7). It can be seen that $k_{1L}+k_{1R}=0.452$ and $k_{2L}+k_{2R}=0.374$, the weight of the half crank web is $\{1-(0.452+0.374)\}=0.174$ and the crankshaft is reduced in weight by around 17% compared with the case of $k_{1L}=k_{1R}=0.25$, in the above case.

Embodiment 2

In Embodiment 1, the crank pins of the crankshaft are in the STD arrangement shown in FIG. 12(A). In this case, all of the primary inertia force, the secondary inertia force and the secondary inertia couple are made substantially 0 because of symmetry of the respective cylinders, so that the remaining primary inertia couple is only offset by means of the primary balancer. In this case, the additional weight $W_{add}$ of a crank web of each cylinder is set at ½ of the weight of the reciprocating portion (the balance ratio is 50%) and the weight of the crank web is divided between a pair of left and right half crank webs. That is, the balance ratio ($k_L$) of a half crank web whose distance from the center of the crankshaft is large (namely, which is far from the center) is made large (weighted by 25% or more) while the balance ratio ($k_R$) of a half crank web whose distance from the center of the crankshaft is small (namely, which is near from the center) is made small (lightened by 25% or less) in order to make the total balance ratio ($k_L+k_R$) 50% or less. This enables the crankshaft to be reduced in weight.

It has been found, however, that the expected effect is achieved even when the invention is applied to a crankshaft other than the crankshaft in the STD arrangement. In other words, no inconvenience will practically arise although the primary inertia force and the secondary inertia force remain a little and the primary inertia couple M(1) is formed into not an exact circle but a little flat ellipse, in the case of arrangement shown in FIGS. 12(B) and 12(C).

In FIG. 12(B), the crank pins of the first and third cylinders are provided on the first plane while the crank pins of the second and fourth cylinders are provided on the second plane. Such a form of the crankshaft is herein referred to as the 90-I arrangement. There can be three kinds of the crank form in accordance with combination of the cylinders (mirror type) in which the balance ratios $k_L$ and $k_R$ are symmetrical (mirror-symmetrical). They are referred to as 90-I-1, 90-I-2 and as shown in Table 1.

TABLE 1

Crank form and web balance ratio

| | Web balance ratio | | | | | | | | |
|---|---|---|---|---|---|---|---|---|---|
| | #1 | | #2 | | #3 | | #4 | | |
| Crank form | $K_{1L}$ | $K_{1R}$ | $K_{2L}$ | $K_{2R}$ | $K_{3L}$ | $K_{3R}$ | $K_{4L}$ | $K_{4R}$ | Mirror type |
| STD | 0.427 | 0.25 | 0.357 | 0.017 | 0.017 | 0.357 | 0.357 | 0.017 | Mirror symmetry between #1 and #4, mirror symmetry between #2 and #3 |
| 90-I-1 | 0.427 | 0.25 | 0.357 | 0.017 | 0.025 | 0.017 | 0.357 | 0.017 | Mirror symmetry between #1 and #3, mirror symmetry between #2 and #4 |

TABLE 1-continued

Crank form and web balance ratio

| | Web balance ratio | | | | | | | | |
|---|---|---|---|---|---|---|---|---|---|
| | #1 | | #2 | | #3 | | #4 | | |
| Crank form | $K_{1L}$ | $K_{1R}$ | $K_{2L}$ | $K_{2R}$ | $K_{3L}$ | $K_{3R}$ | $K_{4L}$ | $K_{4R}$ | Mirror type |
| 90-I-2 | 0.427 | 0.25 | 0.357 | 0.017 | 0.017 | 0.017 | 0.357 | 0.017 | Mirror symmetry between #1 and #4, mirror symmetry between #2 and #3 |
| 90-I-3 | 0.427 | 0.25 | 0.025 | 0.427 | 0.357 | 0.427 | 0.025 | 0.427 | Mirror symmetry between #1 and #2, mirror symmetry between #3 and #4 |
| 90-J-1 | 0.427 | 0.25 | 0.357 | 0.017 | 0.017 | 0.017 | 0.357 | 0.017 | Mirror symmetry between #1 and #4, mirror symmetry between #2 and #3 |
| 90-J-2 | 0.427 | 0.25 | 0.025 | 0.427 | 0.025 | 0.427 | 0.025 | 0.427 | Mirror symmetry between #1 and #2, mirror symmetry between #3 and #4 |
| 90-J-3 | 0.427 | 0.25 | 0.357 | 0.017 | 0.025 | 0.017 | 0.357 | 0.017 | Mirror symmetry between #1 and #3, mirror symmetry between #2 and #4 |

In FIG. 12(C), the crank pins of the first and second cylinders are provided on the first plane while the crank pins of the third and fourth cylinders are provided on the second plane. Such a form is herein referred to as the 90-J arrangement. There can be three kinds of the crank form in accordance with combination of the cylinders (mirror type) in which the balance ratios $k_L$ and $k_R$ are symmetrical (mirror-symmetrical). They are referred to as 90-J-1, 90-J-2 and 90-J-3 as shown in Table 1.

Table 2 shows the primary inertia force F(1), the secondary inertia force F(2) and the primary inertia couple M(1) and the secondary inertia couple M(2), which are calculated in a case that the balance ratios $k_L$, $k_R$, ... $k_{4L}$ and $k_{4R}$ of half crank webs of the respective cylinders are set as shown in Table 1 in the above crank forms. In the calculation, it is assumed that displacement per a cylinder of an engine is equal to 250 cc and a rotational speed is constant.

Generally, in an engine for a motorbike, the inertia couple within around ±30 kgm is not a matter on the basis of a rule of thumb of evaluation of bodily sensed vibrations by a passenger. In view of the evaluation standard, it can be considered that the couples M(1) and M(2) shown in Table 2 are small enough in a range of a general rotational speed of an engine, and therefore, there is no problem in practical use.

Embodiment 3

FIG. 14 is a side view of a motorbike provided with an engine in accordance with the invention. The motorbike is provided in the vicinity of the center of a vehicle body frame 52 with an engine 50.

The vehicle body frame 52 is substantially in the shape of a hook in which the rear part of the frame 52 is bent downward in a side view. The engine 50 is mounted in a space, which is

TABLE 2

Result of calculation of unbalance inertia force

| Remaining unbalance force | Crank form | | | | | | |
|---|---|---|---|---|---|---|---|
| | STD | 90-I-1 | 90-I-2 | 90-I-3 | 90-J-1 | 90-J-2 | 90-J-3 |
| Primary inertia force: F(1) ratio | 0 | 0 | a ≠ 0 | a ≠ 0 | a ≠ 0 | 0 | a ≠ 0 |
| Secondary inertia force: F(2) ratio | 0 | 0 | 0 | 0 | 0 | 0 | 0 |
| Primary inertia couple: M(1) | 0 | 0.81 to 0.99 (oval) | 0.89 (circle) | 73 to 1.06 (oval) | 0.45 (circle) | 0.39 to 0.51 (oval) | 0.33 to 0.56 (oval) |
| Secondary inertia couple: M(2) kgm | 0 | ±0.36 (X) 0 (Y) | ±0.36 (X) 0 (Y) | ±0.36 (X) 0 (Y) | ±0.72 (X) 0 (Y) | ±0.72 (X) 0 (Y) | ±0.72 (X) 0 (Y) |

It can be seen from Table 2 that the primary inertia force F(1) does not become 0 but remains by "a" (≠0) in the 90-I-2 and other arrangements. The quantity of "a" is little enough not to cause a practical matter. The secondary inertia force F(2) is 0 in all arrangements. The primary inertia couple M(1) is formed into an ellipse in the arrangements other than the STD, 90-I-2 and 90-J-1 arrangements. Further, it can be seen that the secondary inertia couple M(2) remains in the X axis (in a direction of a cylinder axis) in the arrangements other than the STD arrangement.

enclosed by the vehicle body frame 52 and opens downward and forward. A crankcase 54 of the engine 50 is divided between upper and lower parts by a dividing surface 54A sharply inclined to the front side. A crankshaft 56, a couple balancer (a primary balancer) 58 and a main transmission shaft 60 are rotatably held on the dividing surface 54A in this order from the lower-front side to the upper-rear side. An output shaft 62, which functions as an auxiliary transmission shaft, is located under the main shaft 60 and rotatably held in a lower half of the crankcase 54.

The crankshaft 56, the balancer 58, the main shaft 60 and the auxiliary shaft 62 are parallel in a width direction of the vehicle body. A cylinder body including four cylinders and a cylinder head 64 rise so as to bend forward from an upper-front surface of the crankcase 54. It goes without saying that the crankshaft 56 and the balancer 58 herein have structures in accordance with the invention. The engine 50 is different from the engine 1 in Embodiment 1 in a point that the main shaft 60 is provided on the dividing surface 54A of the crankcase while the output shaft 62 is provided under the main shaft 60 (refer to FIG. 1). Accordingly, the center of gravity of the engine 50 is in a high position and the size in the front-rear direction of the engine 50 is small, so that the inertia moment around the vertical axis becomes small. This causes easy inclination of the vehicle body to a direction of a turn in turning left and right, and thereby, improvement in turning performance. This is convenient for avoiding an obstacle in a bad road.

66 denotes a rear arm whose front end is held in the vehicle body frame 52 by means of a pivot shaft 68 located on the rear side of the output shaft 62 so that the rear arm can rotate to freely swing in a vertical direction. A rear wheel 70 is held at the rear end of the rear arm 66. Rotation of the output shaft 66 is transmitted to the rear wheel 70 by means of a chain 72. A lower-rear end of the vehicle body frame 52 and the rear arm 66 are connected by means of a connector 74 in a substantially triangle shape in a side view and a link 76. A cylinder-shaped buffer 78 is provided between the connector 74 and the vehicle body frame 52 to add downward return force to the rear wheel 70.

80 denotes a front fork held at the front end of the vehicle body frame 52 so as to be freely rotatable left and right. A front wheel 82 is held at the lower end of the front fork 80. A steering handlebar 84 is fixed to an upper part of the front fork 80. An air cleaner 86 and a fuel tank 88 are provided on the upper side of the vehicle body frame 52 before and behind each other in this order. The air cleaner 86 takes running wind in from the vicinity of the upper part of the front fork 80 to guide the inhaled air to the respective cylinders from a rear surface of the cylinder head 64 through an intake pipe 90. Fuel is blown into the intake pipe 90 from a fuel injection valve 92. 94 denotes an exhaust pipe extending from the front surface of the cylinder head 64 to the rear side through the front and lower sides of the crankcase 54. 96 denotes a driving seat.

In accordance with Embodiment 3, the crankshaft 56 is of two-plane type, and therefore, vibrations characteristic in S/N of driving torque, amplitude of vibrations, frequency and the like are transmitted to the vehicle body frame 52. This enables a driver to feel the driving torque of an engine all over his or her body. Accordingly, the acceleration feeling is improved, and thereby, a driving sense is extremely improved.

The invention claimed is:

1. An in-line four-cylinder engine for a vehicle including a crankshaft having first crank pins of two cylinders, wherein the first crank pins are provided on a common first virtual plane and are arranged with a 180° phase difference, and having second crank pins of another two cylinders, wherein the second crank pins are provided on a second virtual plane different by a 90° phase from the first virtual plane and are arranged with a 180° phase difference, the in-line four-cylinder engine comprising:

a crankshaft satisfying a formula of $(k_L-0.25)(0.25-k_R) \cong D_R/D_L$, wherein, when a crank web for each of at least two cylinders is divided between a pair of half crank webs facing a crank pin, wherein $k_L$, $k_R$ denote balance ratios of the both half crank webs (wherein $k_L \neq 0.25$, $k_R \neq 0.25$) and $D_L$, $D_R$ denote distances from the center in a longitudinal direction of the crankshaft to the respective half crank webs, the crank webs for the four cylinders of the engine are set so that a track of a vector of a primary inertial couple is formed into a substantially circular shape; and a primary balancer for generating a couple vector offsetting a vector of the first inertia couple.

2. The in-line four-cylinder engine for a vehicle according to claim 1, wherein $(k_L+k_R)$ for at least a part of the cylinders is less than 0.5.

3. The in-line four-cylinder engine for a vehicle according to claim 1, wherein $(k_L+k_R)$ for at least a part of the cylinders is more than 0.5.

4. The in-line four-cylinder engine for a vehicle according to claim 1, wherein two cylinders satisfy a condition in claim 1 and both of the balance ratios $k_L$ and $k_R$ of the other two cylinders are set at 0.25.

5. The in-line four-cylinder engine for a vehicle according to any one of claims 1 to 3, wherein the crankshaft has crank pins of the first and fourth cylinders located on the first virtual plane, and crank pins of the second and third cylinders located on the second virtual plane, when the first to fourth cylinders are provided in this order from an end.

6. The in-line four-cylinder engine for a vehicle according to claim 1, wherein the crankshaft has crank pins of the first and third cylinders located on the first virtual plane, and crank pins of the second and fourth cylinders located on the second virtual plane.

7. The in-line four-cylinder engine for a vehicle according to claim 1, wherein the crankshaft has crank pins of the first and second cylinders located on the first virtual plane, and crank pins of the third and fourth cylinders located on the second virtual plane.

8. The in-line four-cylinder engine for a vehicle according to claim 5, wherein balance ratios $k_L$ and $k_R$ and distances $D_L$ and $D_R$ of half crank webs of the respective cylinders are symmetrical between the first and fourth cylinders and symmetrical between the second and third cylinders.

9. The in-line four-cylinder engine for a vehicle according to claim 6 or 7, wherein the distances $D_L$ and $D_R$ are symmetrical between the first and fourth cylinders and between the second and third cylinders while the balance ratios $k_L$ and $k_R$ of half crank webs are symmetrical between two arbitrary combined cylinders.

10. The in-line four-cylinder engine in claim 1, wherein the primary balancer is provided parallel to the crankshaft, and balance weight is provided at a location opposite to the crank pins of the second and third cylinders or at a location opposite to the crank pins of the first and fourth cylinders.

11. A vehicle provided with the in-line four-cylinder engine for a vehicle according to claim 1.

12. The in-line four-cylinder engine in claim 1, wherein the primary balancer shaft is the only balancer shaft.

13. The in-line four-cylinder engine in claim 1, wherein each of $k_L$ and $k_R$ are defined by the formula $k=(M-W_{rot}*r/4)/(W_{rec}*r)$, and further wherein M denotes total unbalance quantity of a corresponding half crank web (whose unit is the moment g*mm), $W_{rot}$ denotes mass for a rotating portion, $W_{rec}$ denotes mass for a reciprocating portion, and r denotes the rotational radius of $W_{rot}$ and $W_{rec}$.

* * * * *